United States Patent
Park et al.

(10) Patent No.: US 11,499,046 B2
(45) Date of Patent: *Nov. 15, 2022

(54) THERMOPLASTIC RESIN COMPOSITION

(71) Applicant: LG CHEM, LTD., Seoul (KR)

(72) Inventors: Chun Ho Park, Daejeon (KR); Yong Yeon Hwang, Daejeon (KR); Da Eun Sung, Daejeon (KR); Yong Hee An, Daejeon (KR); Jeong Min Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 26 days.

This patent is subject to a terminal disclaimer.

(21) Appl. No.: 17/055,493

(22) PCT Filed: Nov. 13, 2019

(86) PCT No.: PCT/KR2019/015387
§ 371 (c)(1),
(2) Date: Nov. 13, 2020

(87) PCT Pub. No.: WO2020/101332
PCT Pub. Date: May 22, 2020

(65) Prior Publication Data
US 2021/0108070 A1  Apr. 15, 2021

(30) Foreign Application Priority Data
Nov. 13, 2018  (KR) .......................... 10-2018-0139152

(51) Int. Cl.
*C08L 55/02* (2006.01)
*C08L 25/14* (2006.01)
*C08L 33/12* (2006.01)

(52) U.S. Cl.
CPC .............. *C08L 55/02* (2013.01); *C08L 25/14* (2013.01); *C08L 33/12* (2013.01); *C08L 2205/03* (2013.01)

(58) Field of Classification Search
CPC ...... C08L 25/14; C08L 33/12; C08L 2205/03; C08F 265/04
See application file for complete search history.

(56) References Cited

U.S. PATENT DOCUMENTS

| | | | |
|---|---|---|---|
| 2013/0281603 A1 | 10/2013 | Jin et al. | |
| 2015/0011709 A1 | 1/2015 | Ahn et al. | |
| 2016/0002455 A1 | 1/2016 | Chung et al. | |
| 2022/0010122 A1* | 1/2022 | Sung ..................... | C08L 25/12 |

FOREIGN PATENT DOCUMENTS

| | | |
|---|---|---|
| CN | 104066757 A | 9/2014 |
| CN | 104603198 A | 5/2015 |
| JP | 2007302742 A | 11/2007 |
| KR | 10-0602848 B1 | 7/2006 |
| KR | 10-2012-0051156 A | 5/2012 |
| KR | 10-2012-0072972 A | 7/2012 |
| KR | 10-2014-0005510 A | 1/2014 |
| KR | 10-1654722 B1 | 9/2016 |
| KR | 20170090765 A | 8/2017 |
| KR | 10-2018-0075743 A | 7/2018 |
| KR | 10-2019-0052798 A | 5/2019 |
| KR | 10-2019-0064989 A | 6/2019 |
| WO | WO2012086901 A1 | 6/2012 |

OTHER PUBLICATIONS

Lee et al., electronic translation of KR 1020170090765 (Aug. 2017).*
Extend European Search Report for EP19884117.3, dated Jul. 13, 2021.

* cited by examiner

*Primary Examiner* — Jeffrey C Mullis

(57) ABSTRACT

Provided is a thermoplastic resin composition which includes: a graft copolymer prepared by graft-polymerizing an aromatic vinyl-based monomer and a vinyl cyan-based monomer onto an acrylic rubber polymer having an average particle diameter of 50.0 to 90.0 nm; a matrix copolymer including a $C_1$-$C_3$ alkyl (meth)acrylate-based monomer unit, an aromatic vinyl-based monomer unit and a vinyl cyan-based monomer unit; and an additive including a polymer including a $C_1$-$C_3$ alkyl (meth)acrylate-based monomer unit, specifically, a thermoplastic resin composition which has improved properties in terms of elongation, processability, weather resistance, colorability, hardness, chemical resistance, scratch resistance, a whitening phenomenon, surface gloss and appearance quality while having excellent basic properties.

12 Claims, No Drawings

THERMOPLASTIC RESIN COMPOSITION

CROSS-REFERENCE TO RELATED APPLICATION

This application is a National Phase entry of International Application No. PCT/KR2019/015387, which claims priority to and the benefit of Korean Patent Application No. 10-2018-0139152, filed on Nov. 13, 2018, the disclosures of which are incorporated herein by reference in their entirety.

TECHNICAL FIELD

The present invention relates to a thermoplastic resin composition, and more particularly, to a thermoplastic resin composition which has improved properties in terms of elongation, processability, weather resistance, colorability, chemical resistance, scratch resistance, a whitening phenomenon, surface gloss and appearance quality.

BACKGROUND ART

In conventional paint coating processes that include curing, harmful substances such as volatile organic compounds are released into the atmosphere, causing environmental pollution, and thus, legal regulations are being strengthened worldwide.

For this reason, as an outer plate material for home appliances, a polymer-coated metal (PCM) is generally used at present for the purpose of preventing corrosion, reducing friction, and providing surface gloss. Particularly among PCMs, the use of a vinyl-coated metal (VCM), which includes a vinyl resin coating, is increasing in line with the demand for high end final products. A VCM is a material that includes a galvanized steel plate and PVC and PET film coatings applied thereon, and is used as an outer plate material for home appliances. Further, a VCM can be used for building materials, furniture, automobiles, electrical materials, roof tiles and the like.

While various coating materials for VCMs are currently being developed, since the PVC and PET film coatings applied to an outer plate material have poor weather resistance, an acrylonitrile-styrene-acrylate (ASA) graft copolymer having excellent weather resistance can be an alternative. In such ASA graft copolymers, an acryl-based rubber polymer is mainly used as a core for improving impact resistance, and styrene, acrylonitrile, methyl methacrylate and the like are used as a shell for improving colorability and dispersibility in a matrix copolymer.

For application to a VCM, an ASA graft copolymer should have high elongation to prevent tearing during press forming of the sheet metal and be able to exhibit excellent surface quality even when processed at high temperature.

Therefore, efforts have been continuously made to develop a thermoplastic resin composition that includes an ASA graft copolymer having high elongation and not generating bubbles even when processed at high temperature.

DISCLOSURE

Technical Problem

The present invention is directed to providing a thermoplastic resin composition having improved properties in terms of elongation, processability, weather resistance, colorability, chemical resistance, scratch resistance, a whitening phenomenon, surface gloss and appearance quality while maintaining basic properties such as impact resistance, hardness and the like.

Technical Solution

In the present invention, there is provided a thermoplastic resin composition which includes: a graft copolymer prepared by graft-polymerizing an aromatic vinyl-based monomer and a vinyl cyan-based monomer onto an acrylic rubber polymer having an average particle diameter of 50.0 to 90.0 nm; a matrix copolymer including a $C_1$-$C_3$ alkyl (meth)acrylate-based monomer unit, an aromatic vinyl-based monomer unit and a vinyl cyan-based monomer unit; and an additive including a polymer including a $C_1$-$C_3$ alkyl (meth)acrylate-based monomer unit.

Advantageous Effects

The thermoplastic resin composition of the present invention can exhibit significantly improved properties in terms of elongation, processability, weather resistance, colorability, chemical resistance, scratch resistance, a whitening phenomenon, surface gloss and appearance quality while having excellent basic properties such as impact resistance, hardness and the like.

MODES OF THE INVENTION

Hereinafter, the present invention will be described in more detail to facilitate understanding of the present invention.

Terms and words used in this specification and claims should not be interpreted as being limited to commonly used meanings or meanings in dictionaries, and, based on the principle that the inventors can appropriately define concepts of terms in order to describe their invention in the best way, the terms and words should be interpreted with meanings and concepts which are consistent with the technical spirit of the present invention.

In the present invention, the average particle diameters of a seed, a core, an acrylic rubber polymer and a graft copolymer may be measured by a dynamic light scattering method, more specifically using a Nicomp 380 HPL instrument (manufactured by Nicomp).

In the present specification, an average particle diameter may refer to an arithmetic average particle diameter in the particle size distribution as measured by a dynamic light scattering method, that is, an average particle diameter in the scattering intensity distribution.

In the present invention, a degree of grafting for a graft copolymer may be calculated by the following equation.

Degree of grafting (%): Weight of grafted monomers (g)/Weight of acrylic rubber polymer (g)×100

Weight of grafted monomers (g): Weight of insoluble material (gel) obtained after 1 g of graft copolymer is dissolved in 30 g of acetone and centrifuged Weight of acrylic rubber polymer (g): Theoretical weight of $C_4$-$C_{10}$ alkyl (meth)acrylate-based monomer in graft copolymer powder, or weight of $C_4$-$C_{10}$ alkyl (meth)acrylate-based monomer added in preparation of graft copolymer In the present invention, the weight-average molecular weight of a shell of a graft copolymer may refer to the weight-average molecular weight of a copolymer which includes an aromatic vinyl-based monomer unit and a vinyl cyan-based monomer unit that are graft-polymerized onto an acrylic rubber polymer.

In the present invention, the weight-average molecular weight of a shell of a graft copolymer may be measured as a relative value with respect to a standard polystyrene (PS) sample by gel permeation chromatography after dissolving, in a tetrahydrofuran solution, the portion (sol) that has been dissolved in acetone for measuring a degree of grafting.

In the present invention, the weight-average molecular weight of a matrix copolymer may be measured as a relative value with respect to a standard poly(methyl methacrylate) sample manufactured by Polymer Laboratories Ltd. by gel permeation chromatography, using tetrahydrofuran as an eluent.

In the present invention, the polymerization conversion rate of a matrix copolymer may be calculated by the following equation.

Polymerization conversion rate (%)={(Weight of solid content of actually obtained copolymer)/(Weight of prescriptively added monomers)}×100

In the present invention, the weight-average molecular weight of a polymer included in an additive may be measured as a relative value with respect to a standard poly (methyl methacrylate) sample (manufactured by Polymer Laboratories Ltd.) by gel permeation chromatography, using tetrahydrofuran as an eluent.

In the present invention, the polymerization conversion rate of a polymer included in an additive may be determined by extracting residual monomer components from the polymer by a reprecipitation method using chloroform ($CHCl_3$) and methanol and then quantitatively analyzing the same using a gas chromatography-mass spectrometry (GC-MSD).

In the present invention, "polymer" should be understood as encompassing both a homopolymer which is formed by polymerizing one type of monomer and a copolymer which is formed by polymerizing two or more types of monomers.

In the present invention, an aromatic vinyl-based monomer unit may be a unit derived from an aromatic vinyl-based monomer, and the aromatic vinyl-based monomer may be one or more selected from the group consisting of styrene, α-methylstyrene, p-methylstyrene, 2,4-dimethylstyrene and vinyl toluene, and is preferably styrene.

In the present invention, a vinyl cyan-based monomer unit may be a unit derived from a vinyl cyan-based monomer, and the vinyl cyan-based monomer may be one or more selected from the group consisting of acrylonitrile, methacrylonitrile and ethacrylonitrile, and is preferably acrylonitrile.

In the present invention, a $C_1$-$C_3$ alkyl (meth)acrylate-based monomer unit may be a unit derived from a $C_1$-$C_3$ alkyl (meth)acrylate-based monomer, and the $C_1$-$C_3$ alkyl (meth)acrylate-based monomer may be one or more selected from the group consisting of methyl (meth)acrylate, ethyl (meth)acrylate and propyl (meth)acrylate, and is preferably one or more selected from the group consisting of methyl methacrylate and methyl acrylate.

1. Thermoplastic Resin Composition

The thermoplastic resin composition according to one embodiment of the present invention includes: 1) a graft copolymer prepared by graft-polymerizing an aromatic vinyl-based monomer and a vinyl cyan-based monomer onto an acrylic rubber polymer having an average particle diameter of 50.0 to 90.0 nm; 2) a matrix copolymer including a $C_1$-$C_3$ alkyl (meth)acrylate-based monomer unit, an aromatic vinyl-based monomer unit and a vinyl cyan-based monomer unit; and 3) an additive including a polymer including a $C_1$-$C_3$ alkyl (meth)acrylate-based monomer unit.

Hereinafter, each component of the thermoplastic resin composition according to one embodiment of the present invention will be described in detail.

1) Graft Copolymer

The graft copolymer is prepared by graft-polymerizing an aromatic vinyl-based monomer and a vinyl cyan-based monomer onto an acrylic rubber polymer having an average particle diameter of 50.0 to 90.0 nm.

The graft copolymer may serve to improve the weather resistance, elongation, colorability, chemical resistance, processability, surface gloss characteristics and whitening properties of the thermoplastic resin composition.

The acrylic rubber polymer may have an average particle diameter of 50.0 to 90.0 nm, preferably 65.0 to 75.0 nm. When the above-described range is satisfied, the weather resistance of the acrylic rubber polymer can be improved because a specific surface area increases as an average particle diameter decreases. In addition, since the acrylic rubber polymer allows visible light to pass therethrough, colorability can be significantly improved. In addition, since a large amount of the graft copolymer can be uniformly dispersed in the thermoplastic resin composition, elongation and whitening properties can be significantly improved. Below the above-described range, impact strength may be significantly lowered, and above the above-described range, whitening properties may be significantly degraded.

The graft copolymer may be a copolymer prepared by graft-polymerizing styrene and acrylonitrile onto a butyl acrylate rubber polymer.

The graft copolymer may have a degree of grafting of 25 to 50% or 30 to 45%, preferably 30 to 45%. When the above-described range is satisfied, not only can the compatibility thereof with the matrix copolymer be significantly improved due to the aromatic vinyl-based monomer unit and the vinyl cyan-based monomer unit graft-polymerized onto the acrylic rubber polymer, but also the elongation, whitening properties and impact resistance of the thermoplastic resin composition can be significantly improved.

The graft copolymer may have a shell having a weight-average molecular weight of 30,000 to 200,000 g/mol, 50,000 to 180,000 g/mol or 80,000 to 150,000 g/mol, preferably 80,000 to 150,000 g/mol. When the above-described range is satisfied, the compatibility thereof with other components can be improved, and the dispersibility of the acrylic rubber polymer in the thermoplastic resin composition can be improved.

Meanwhile, the graft copolymer may be prepared by forming a seed by adding one or more selected from the group consisting of a $C_4$-$C_{10}$ alkyl (meth)acrylate-based monomer, an aromatic vinyl-based monomer and a vinyl cyan-based monomer and carrying out crosslinking, forming a core in the presence of the seed by adding a $C_4$-$C_{10}$ alkyl (meth)acrylate-based monomer and carrying out crosslinking, and forming a shell in the presence of the core by adding an aromatic vinyl-based monomer and a vinyl cyan-based monomer and carrying out graft-polymerization.

Here, the core may refer to the above-described acrylic rubber polymer.

The $C_4$-$C_{10}$ alkyl (meth)acrylate-based monomer may be one or more selected from the group consisting of butyl (meth)acrylate, pentyl (meth)acrylate, hexyl (meth)acrylate, heptyl (meth)acrylate, octyl (meth)acrylate, ethylhexyl (meth)acrylate, nonyl (meth)acrylate, isononyl (meth)acrylate and decyl (meth)acrylate, and is preferably butyl acrylate.

The $C_4$-$C_{10}$ alkyl (meth)acrylate-based monomer may be added in an amount of 30 to 50 wt % or 35 to 45 wt %, preferably 35 to 45 wt %, based on the total weight of the monomers added in the preparation of the graft copolymer. When the above-described range is satisfied, the weather resistance, impact resistance, surface gloss characteristics, elongation and whitening properties of the graft copolymer can be improved.

The aromatic vinyl-based monomer may be added in an amount of 30 to 50 wt % or 35 to 45 wt %, preferably 35 to 45 wt %, based on the total weight of the monomers added in the preparation of the graft copolymer. When the above-described range is satisfied, not only can the processability of the graft copolymer be improved, but also the graft copolymer can be more uniformly dispersed in the thermoplastic resin composition, and the colorability of the thermoplastic resin composition can be improved.

The vinyl cyan-based monomer may be added in an amount of 10 to 30 wt % or 15 to 25 wt %, preferably 15 to 25 wt %, based on the total weight of the monomers added in the preparation of the graft copolymer. When the above-described range is satisfied, not only can the chemical resistance of the graft copolymer be improved, but also the graft copolymer can be more uniformly dispersed in the thermoplastic resin composition, and the colorability of the thermoplastic resin composition can be improved.

Meanwhile, the total weight of the monomers added in the preparation of the seed may be 1 to 20 wt % or 5 to 15 wt %, preferably 5 to 15 wt %, based on the total weight of the monomers added in the preparation of the graft copolymer.

The total weight of the monomers added in the preparation of the core may be 20 to 50 wt % or 25 to 45 wt %, preferably 25 to 45 wt %, based on the total weight of the monomers added in the preparation of the graft copolymer.

The total weight of the monomers added in the preparation of the shell may be 40 to 70 wt % or 45 to 65 wt %, preferably 45 to 65 wt %, based on the total weight of the monomers added in the preparation of the graft copolymer.

The graft copolymer may be included in an amount of 30 to 80 wt % or 35 to 75 wt %, preferably 35 to 75 wt %, based on the total weight of the thermoplastic resin composition. When the above-described range is satisfied, the elongation, weather resistance, chemical resistance, colorability, processability, surface gloss characteristics, appearance quality and whitening properties of the thermoplastic resin composition can be significantly improved.

2) Matrix Copolymer

The matrix copolymer is a random copolymer, and includes a $C_1$-$C_3$ alkyl (meth)acrylate-based monomer unit, an aromatic vinyl-based monomer unit and a vinyl cyan-based monomer unit.

Since the matrix copolymer includes the $C_1$-$C_3$ alkyl (meth)acrylate-based monomer unit, which is a component of the additive, and the aromatic vinyl-based monomer unit and the vinyl cyan-based monomer unit, which are components of the shell of the graft copolymer, the matrix copolymer not only can have excellent compatibility with the graft copolymer and the additive but also can allow the compatibility between the graft copolymer and the polymer to be improved. Therefore, the thermoplastic resin composition according to one embodiment of the present invention is not phase-separated even when molded at high temperature.

In addition, the matrix copolymer may allow the colorability, weather resistance and hardness of the thermoplastic resin composition to be improved.

The matrix copolymer may be a copolymer prepared using a monomer mixture including a $C_1$-$C_3$ alkyl (meth)acrylate-based monomer, an aromatic vinyl-based monomer and a vinyl cyan-based monomer.

The monomer mixture may include the $C_1$-$C_3$ alkyl (meth)acrylate-based monomer in an amount of 25 to 75 wt % or 30 to 70 wt %, preferably 30 to 70 wt %. When the above-described range is satisfied, not only can the compatibility with a polymer included in the additive be significantly improved, but also the colorability, weather resistance and hardness of the thermoplastic resin composition can be significantly improved.

The monomer mixture may include the aromatic vinyl-based monomer in an amount of 15 to 60 wt % or 20 to 55 wt %, preferably 20 to 55 wt %. When the above-described range is satisfied, not only can the compatibility with the graft copolymer be significantly improved, but also the colorability, weather resistance and hardness of the thermoplastic resin composition can be significantly improved.

The monomer mixture may include the vinyl cyan-based monomer in an amount of 1 to 20 wt % or 5 to 15 wt %, preferably 5 to 15 wt %. When the above-described range is satisfied, not only can the compatibility with the graft copolymer be significantly improved, but also the colorability, weather resistance and hardness of the thermoplastic resin composition can be significantly improved.

The matrix copolymer may be a copolymer of methyl methacrylate, styrene and acrylonitrile.

The matrix copolymer may have a weight-average molecular weight of 50,000 to 200,000 g/mol, 60,000 to 170,000 g/mol or 70,000 to 140,000 g/mol, preferably 70,000 to 140,000 g/mol. When the above-described range is satisfied, the balance among processability, compatibility and hardness can be excellent.

The matrix copolymer may be included in an amount of 0.1 to 30.0 wt % or 1.0 to 25.0 wt %, preferably 1.0 to 25.0 wt %, based on the total weight of the thermoplastic resin composition. When the above-described range is satisfied, not only can the compatibility between the graft copolymer and the additive be significantly improved, but also the colorability, weather resistance and hardness of the thermoplastic resin composition can be significantly improved.

3) Additive

The additive includes a polymer including a $C_1$-$C_3$ alkyl (meth)acrylate-based monomer unit.

The additive may allow the hardness, surface gloss, scratch resistance, appearance quality and weather resistance of the thermoplastic resin composition to be improved.

The polymer may have a weight-average molecular weight of 150,000 to 250,000 g/mol, 170,000 to 230,000 g/mol or 190,000 to 210,000 g/mol, preferably 190,000 to 210,000 g/mol. When the above-described range is satisfied, a polymer-derived gas may not be generated and the polymer may not be decomposed during the processing of the thermoplastic resin composition. In addition, the hardness, weather resistance, surface gloss, scratch resistance and appearance quality of the thermoplastic resin composition can be significantly improved.

The polymer may be poly(methyl methacrylate).

For the purpose of improving transparency and processability, the polymer may be a copolymer that includes two or more types of $C_1$-$C_3$ alkyl (meth)acrylate-based monomer units, and is preferably a copolymer that includes a $C_1$-$C_3$ alkyl methacrylate-based monomer unit and a $C_1$-$C_3$ alkyl acrylate-based monomer unit. The copolymer may be a copolymer prepared using a monomer mixture including a $C_1$-$C_3$ alkyl methacrylate-based monomer and a $C_1$-$C_3$ alkyl acrylate-based monomer. In this case, the monomer mixture may include the $C_1$-$C_3$ alkyl methacrylate-based monomer and the $C_1$-$C_3$ alkyl acrylate-based monomer in a weight ratio of 80:20 to 99:1 or 85:15 to 95:5, preferably 85:15 to 95:5. When the above-described range is satisfied, the balance among processability, surface gloss, hardness and tensile strength can be excellent.

The copolymer may be a copolymer of methyl methacrylate and methyl acrylate.

The polymer may be included in an amount of 5 to 50 wt % or 10 to 45 wt %, preferably 10 to 45 wt %, based on the total weight of the thermoplastic resin composition. When the above-described range is satisfied, the hardness, weather resistance, surface gloss, scratch resistance and appearance quality of the thermoplastic resin composition can be significantly improved.

Hereinafter, exemplary embodiments of the present invention will be described in detail so that those of ordinary skill in the art can easily carry out the present invention. However, it should be understood that the present invention can be implemented in various forms and that the exemplary embodiments are not intended to limit the present invention thereto.

Preparation Example 1

<Formation of Seed>

To a nitrogen-substituted reactor, 10 parts by weight of butyl acrylate, 0.04 part by weight of potassium persulfate as an initiator, 2 parts by weight of sodium di-2-ethylhexyl sulfosuccinate as an emulsifier, 0.02 part by weight of ethylene glycol dimethacrylate as a crosslinking agent, 0.04 part by weight of allyl methacrylate as a grafting agent, 0.1 part by weight of $NaHCO_3$ as an electrolyte and 40 parts by weight of distilled water were batch-added. After raising the temperature to 65° C., polymerization was carried out for one hour and then terminated, and thereby a butyl acrylate rubber polymer (average particle diameter: 52.5 nm), which is a seed, was obtained.

<Formation of Core>

Polymerization was carried out while continuously adding each of the following to the seed-containing reactor at 70° C. for three hours at a constant rate: a mixture including 30 parts by weight of butyl acrylate, 0.5 part by weight of sodium di-2-ethylhexyl sulfosuccinate as an emulsifier, 0.2 part by weight of ethylene glycol dimethacrylate as a crosslinking agent, 0.2 part by weight of allyl methacrylate as a grafting agent, 0.1 part by weight of $NaHCO_3$ as an electrolyte and 20 parts by weight of distilled water; and 0.06 part by weight of potassium persulfate as an initiator. After the continuous addition was completed, the polymerization was continued for another hour and then terminated, and thereby a butyl acrylate rubber polymer (average particle diameter: 68.5 nm), which is a core, was obtained.

<Preparation of Graft Copolymer>

Polymerization was carried out while continuously adding each of the following to the core-containing reactor at 70° C. for five hours at a constant rate: a mixture including 40 parts by weight of styrene, 20 parts by weight of acrylonitrile, 1.4 parts by weight of potassium rosinate as an emulsifier, 0.042 part by weight of KOH as an electrolyte, 0.05 part by weight of t-dodecyl mercaptan as a molecular-weight regulator and 63 parts by weight of distilled water; and 0.1 part by weight of potassium persulfate as an initiator. After the continuous addition was completed, the polymerization was continued at 70° C. for another hour and then was terminated by lowering the temperature to 60° C., and thereby a graft copolymer latex (average particle diameter: 95.0 nm) was obtained. In this case, the graft copolymer latex had a polymerization conversion rate of 98%, a pH of 9.5 and a degree of grafting of 42%.

After 2 parts by weight of an aqueous calcium chloride solution (concentration: 10 wt %) was added to the graft copolymer latex, atmospheric coagulation at 85° C., aging at 95° C., dehydration and washing, and 30-minute drying with 90° C. hot air were carried out, and thereby a graft copolymer powder was obtained.

Preparation Example 2

<Formation of Seed>

To a nitrogen-substituted reactor, 7.5 parts by weight of styrene, 2.5 parts by weight of acrylonitrile, 0.2 part by weight of sodium di-2-ethylhexyl sulfosuccinate as an emulsifier, 0.04 part by weight of ethylene glycol dimethacrylate as a crosslinking agent, 0.04 part by weight of allyl methacrylate as a grafting agent, 0.2 part by weight of $NaHCO_3$ as an electrolyte and 40 parts by weight of distilled water were batch-added. After raising the temperature to 70° C., polymerization was initiated by batch-adding 0.05 part by weight of potassium persulfate. The polymerization was carried out at 70° C. for one hour and then terminated, and thereby a styrene-acrylonitrile rubber polymer (average particle diameter: 160.0 nm), which is a seed, was obtained.

<Formation of Core>

Polymerization was carried out while continuously adding, to the seed-containing reactor at 70° C. for three hours at a constant rate, a mixture including 40 parts by weight of butyl acrylate, 0.5 part by weight of sodium di-2-ethylhexyl sulfosuccinate as an emulsifier, 0.2 part by weight of ethylene glycol dimethacrylate as a crosslinking agent, 0.2 part by weight of allyl methacrylate as a grafting agent, 0.1 part by weight of $NaHCO_3$ as an electrolyte, 0.05 part by weight of potassium persulfate and 20 parts by weight of distilled water. After the continuous addition was completed, the polymerization was continued for another hour and then terminated, and thereby a butyl acrylate rubber polymer (average particle diameter: 280.0 nm), which is a core, was obtained.

<Preparation of Graft Copolymer>

Polymerization was carried out while continuously adding each of the following to the core-containing reactor at 70° C. for five hours at a constant rate: a mixture including 37.5 parts by weight of styrene, 12.5 parts by weight of acrylonitrile, 0.1 part by weight of potassium persulfate as an initiator, 1.5 parts by weight of potassium rosinate as an emulsifier, 0.05 part by weight of t-dodecyl mercaptan as a molecular-weight regulator and 63 parts by weight of distilled water; and 0.1 part by weight of potassium persulfate as an initiator. After the continuous addition was completed, the polymerization was continued at 75° C. for another hour and then was terminated by lowering the temperature to 60° C., and thereby a graft copolymer latex (average particle diameter: 350.0 nm) was obtained. In this case, the graft copolymer latex had a polymerization conversion rate of 98%, a pH of 9.5 and a degree of grafting of 38%.

After 2 parts by weight of an aqueous calcium chloride solution (concentration: 10 wt %) was added to the graft copolymer latex, atmospheric coagulation at 85° C., aging at 95° C., dehydration and washing, and 30-minute drying with 90° C. hot air were carried out, and thereby a graft copolymer powder was obtained.

Preparation Example 3

An activator solution including 0.015 part by weight of disodium ethylenediaminetetraacetate, 0.02 part by weight of sodium formaldehyde sulfoxylate, 0.001 part by weight of ferrous sulfate heptahydrate and 1.165 parts by weight of distilled water was prepared.

Meanwhile, to a 3-L four-necked reactor equipped with a thermometer, a nitrogen injector, a cooler and a stirrer, 100 parts by weight of distilled water and 4 parts by weight of an aqueous sodium lauryl sulfate solution (concentration: 3 wt %) as an emulsifier were added, and subsequently, 9 parts by weight of methyl methacrylate, 15.75 parts by weight of styrene, 5.25 parts by weight of acrylonitrile and 0.01 part by weight of t-dodecyl mercaptan as a molecular-weight regulator were added while stirring. Subsequently, the temperature was raised to 60° C. while continuously adding nitrogen.

After 0.3 part by weight of an aqueous potassium persulfate solution (concentration: 3 wt %) as an initiator and 5 parts by weight of the activator solution were batch-added while maintaining the temperature in the reactor at 60° C., polymerization was carried out for two hours, and thereby a copolymer latex was obtained.

Meanwhile, a pre-emulsion was prepared by mixing 50 parts by weight of distilled water, 5 parts by weight of an aqueous sodium lauryl sulfate solution (concentration: 3 wt %), 21 parts by weight of methyl methacrylate, 36.75 parts by weight of styrene and 12.25 parts by weight of acrylonitrile and stabilizing the mixture.

After raising the temperature of the reactor to 65° C., the pre-emulsion, 0.1 part by weight of an aqueous potassium persulfate solution (concentration: 3 wt %) as an initiator and 5 parts by weight of the activator solution were batch-added and polymerized for two hours, and thereby a polymer latex was prepared. In this case, the polymer latex had a polymerization conversion rate of 99%, an average particle diameter of 150.0 nm and a weight-average molecular weight of 80,000 g/mol.

The polymer latex was cooled slowly at room temperature and then for eight hours at −15° C. The cold copolymer latex was thawed at room temperature and was thereby separated into two phases, and the portion that settled at the bottom was collected. The collected portion was washed with distilled water and then dried in a vacuum oven for 24 hours to remove moisture and unreacted monomers therefrom, and thereby white, finely shaped particles were obtained.

Preparation Example 4

An activator solution including 0.015 part by weight of disodium ethylenediaminetetraacetate, 0.02 part by weight of sodium formaldehyde sulfoxylate, 0.001 part by weight of ferrous sulfate heptahydrate and 1.165 parts by weight of distilled water was prepared.

Meanwhile, to a 3-L four-necked reactor equipped with a thermometer, a nitrogen injector, a cooler and a stirrer, 100 parts by weight of distilled water and 4 parts by weight of an aqueous sodium lauryl sulfate solution (concentration: 3 wt %) as an emulsifier were added, and subsequently, 21 parts by weight of methyl methacrylate, 6.75 parts by weight of styrene, 2.25 parts by weight of acrylonitrile and 0.01 part by weight of t-dodecyl mercaptan as a molecular-weight regulator were added while stirring. Subsequently, the temperature was raised to 60° C. while continuously adding nitrogen.

After 0.3 part by weight of an aqueous potassium persulfate solution (concentration: 3 wt %) as an initiator and 5 parts by weight of the activator solution were batch-added while maintaining the temperature in the reactor at 60° C., polymerization was carried out for two hours, and thereby a copolymer latex was obtained.

Meanwhile, a pre-emulsion was prepared by mixing 50 parts by weight of distilled water, 5 parts by weight of an aqueous sodium lauryl sulfate solution (concentration: 3 wt %), 49 parts by weight of methyl methacrylate, 15.75 parts by weight of styrene and 5.25 parts by weight of acrylonitrile and stabilizing the mixture.

After raising the temperature of the reactor to 65° C., the pre-emulsion, 0.1 part by weight of an aqueous potassium persulfate solution (concentration: 3 wt %) as an initiator and 5 parts by weight of the activator solution were batch-added and polymerized for two hours, and thereby a polymer latex was prepared. In this case, the polymer latex had a polymerization conversion rate of 99%, an average particle diameter of 150.0 nm and a weight-average molecular weight of 80,000 g/mol.

The polymer latex was cooled slowly at room temperature and then for eight hours at −15° C. The cold copolymer latex was thawed at room temperature and was thereby separated into two phases, and the portion that settled at the bottom was collected. The collected portion was washed with distilled water and then dried in a vacuum oven for 24 hours to remove moisture and unreacted monomers therefrom, and thereby white, finely shaped particles were obtained.

Preparation Example 5

An activator solution including 0.015 part by weight of disodium ethylenediaminetetraacetate, 0.02 part by weight of sodium formaldehyde sulfoxylate, 0.001 part by weight of ferrous sulfate heptahydrate and 1.165 parts by weight of distilled water was prepared.

Meanwhile, to a 3-L four-necked reactor equipped with a thermometer, a nitrogen injector, a cooler and a stirrer, 100 parts by weight of distilled water and 4 parts by weight of an aqueous sodium lauryl sulfate solution (concentration: 3 wt %) as an emulsifier were added, and subsequently, 4.5 parts by weight of methyl methacrylate, 19.12 parts by weight of styrene, 6.38 parts by weight of acrylonitrile and 0.01 part by weight of t-dodecyl mercaptan as a molecular-weight regulator were added while stirring. Subsequently, the temperature was raised to 60° C. while continuously adding nitrogen.

After 0.3 part by weight of an aqueous potassium persulfate solution (concentration: 3 wt %) as an initiator and 5 parts by weight of the activator solution were batch-added while maintaining the temperature in the reactor at 60° C., polymerization was carried out for two hours, and thereby a copolymer latex was obtained.

Meanwhile, a pre-emulsion was prepared by mixing 50 parts by weight of distilled water, 5 parts by weight of an aqueous sodium lauryl sulfate solution (concentration: 3 wt %), 10.5 parts by weight of methyl methacrylate, 44.63 parts by weight of styrene and 14.87 parts by weight of acrylonitrile and stabilizing the mixture.

After raising the temperature of the reactor to 65° C., the pre-emulsion, 0.1 part by weight of an aqueous potassium persulfate solution (concentration: 3 wt %) as an initiator and 5 parts by weight of the activator solution were batch-added and polymerized for two hours, and thereby a polymer latex was prepared. In this case, the polymer latex had a polymerization conversion rate of 99%, an average particle diameter of 150.0 nm and a weight-average molecular weight of 80,000 g/mol.

The polymer latex was cooled slowly at room temperature and then for eight hours at −15° C. The cold copolymer latex was thawed at room temperature and was thereby separated into two phases, and the portion that settled at the bottom was collected. The collected portion was washed with distilled water and then dried in a vacuum oven for 24 hours to remove moisture and unreacted monomers therefrom, and thereby white, finely shaped particles were obtained.

Preparation Example 6

An activator solution including 0.015 part by weight of disodium ethylenediaminetetraacetate, 0.02 part by weight of sodium formaldehyde sulfoxylate, 0.001 part by weight of ferrous sulfate heptahydrate and 1.165 parts by weight of distilled water was prepared.

Meanwhile, to a 3-L four-necked reactor equipped with a thermometer, a nitrogen injector, a cooler and a stirrer, 100 parts by weight of distilled water and 4 parts by weight of an aqueous sodium lauryl sulfate solution (concentration: 3 wt %) as an emulsifier were added, and subsequently, 25.5 parts by weight of methyl methacrylate, 3.38 parts by weight of styrene, 1.12 parts by weight of acrylonitrile and 0.01 part by weight of t-dodecyl mercaptan as a molecular-weight regulator were added while stirring. Subsequently, the temperature was raised to 60° C. while continuously adding nitrogen.

After 0.3 part by weight of an aqueous potassium persulfate solution (concentration: 3 wt %) as an initiator and 5 parts by weight of the activator solution were batch-added while maintaining the temperature in the reactor at 60° C., polymerization was carried out for two hours, and thereby a copolymer latex was obtained.

Meanwhile, a pre-emulsion was prepared by mixing 50 parts by weight of distilled water, 5 parts by weight of an aqueous sodium lauryl sulfate solution (concentration: 3 wt %), 59.5 parts by weight of methyl methacrylate, 7.88 parts by weight of styrene and 2.62 parts by weight of acrylonitrile and stabilizing the mixture.

After raising the temperature of the reactor to 65° C., the pre-emulsion, 0.1 part by weight of an aqueous potassium persulfate solution (concentration: 3 wt %) as an initiator and 5 parts by weight of the activator solution were batch-added and polymerized for two hours, and thereby a polymer latex was prepared. In this case, the polymer latex had a polymerization conversion rate of 99%, an average particle diameter of 150.0 nm and a weight-average molecular weight of 80,000 g/mol.

The polymer latex was cooled slowly at room temperature and then for eight hours at −15° C. The cold copolymer latex was thawed at room temperature and was thereby separated into two phases, and the portion that settled at the bottom was collected. The collected portion was washed with distilled water and then dried in a vacuum oven for 24 hours to remove moisture and unreacted monomers therefrom, and thereby white, finely shaped particles were obtained.

Preparation Example 7

A first copolymer was prepared by carrying out polymerization at 140° C. while continuously adding a polymerization solution including 25 parts by weight of toluene, 75 parts by weight of styrene, 25 parts by weight of acrylonitrile, 0.02 part by weight of 1,1-bis(t-butylperoxy)-3,3,5-trimethylcyclohexane as an initiator and 0.08 part by weight of n-dodecyl mercaptan as a molecular-weight regulator to a nitrogen-substituted 26-L first reactor at a rate of 14 L/hr for one hour, and a second copolymer was prepared by carrying out polymerization at 150° C. while continuously adding the first copolymer to a nitrogen-substituted 26-L second reactor at a rate of 14 L/hr for one hour. In this case, the polymerization conversion rate was 60%. The obtained second copolymer was transferred to a volatilization tank where unreacted monomers and a reaction medium were removed at 215° C., and thereby a copolymer (weight-average molecular weight: 120,000 g/mol) in pellet form was obtained.

Examples and Comparative Examples

The specifications of the components used in Examples and Comparative Examples are as follows:
(A) Graft Copolymer
(A-1) Graft copolymer having a small particle diameter: The graft copolymer of Preparation Example 1 was used.
(A-2) Graft copolymer having a large particle diameter: The graft copolymer of Preparation Example 2 was used.
(B) Matrix Copolymer
(B-1) Matrix copolymer #1: The copolymer of Preparation Example 3 was used.
(B-2) Matrix copolymer #2: The copolymer of Preparation Example 4 was used.
(B-3) Matrix copolymer #3: The copolymer of Preparation Example 5 was used.
(B-4) Matrix copolymer #4: The copolymer of Preparation Example 6 was used.
(B-5) Matrix copolymer #5: The copolymer of Preparation Example 7 was used.
(C) Additive: IH830 (copolymer of methyl methacrylate and methyl acrylate) manufactured by LG MMA was used as is after drying.

The above-described components were mixed in contents shown in Table 1 to Table 3 and stirred to prepare thermoplastic resin compositions.

Experimental Example 1

Test specimens were prepared by extruding and injection-molding the thermoplastic resin compositions of Examples and Comparative Examples. The properties of the test specimens were evaluated by the methods described below, and the results are shown in Table 1 to Table 3.
① Impact strength (kg·cm/cm): measured in accordance with ASTM 256.
② Hardness: measured in accordance with ASTM 785.
③ Elongation (%): measured in accordance with ASTM D638.
④ Weather resistance (ΔE): evaluated under SAE J1960 conditions for 2,000 hours using an accelerated weather resistance testing instrument (Ci4000 Weather-Ometer manufactured by ATLAS, xenon-arc lamp, quartz (inner)/S.Boro (outer) filter, irradiance 0.55 W/m² at 340 nm). In the following equation, ΔE is an arithmetic average value obtained before and after the accelerated weather resistance test, and values close to 0 indicate better weather resistance.

$$\Delta E = \sqrt{(L'-L_0)^2 + (a'-a_0)^2 + (b'-b_0)^2}$$

In the above equation, L', a' and b' are the L, a and b values measured in the CIE LAB color coordinate system after irradiating the test specimen with light under SAE J1960 conditions for 2,000 hours, and $L_0$, $a_0$ and $b_0$ are the L, a and b values measured in the CIE LAB color coordinate system before the light irradiation.

Experimental Example 2

After compounding CB5093, which is a black pigment manufactured by Muil Chemical Co., Ltd., each of the thermoplastic resin compositions of the Examples and Comparative Examples were formed into a sheet having a width of 10 cm and a thickness of 0.15 mm using a sheet extruder. The properties of the sheet were evaluated by the method described below, and the results are shown in Table 1 to Table 3.

⑤ Trimming ability: After the sheet was cut at 300 rpm using SJ600 manufactured by Soojung Hi-Tech, the cut surface was visually examined.

∘: Good, x: Poor

Experimental Example 3

A test specimen was prepared by attaching, at 200° C., the sheet prepared in Experimental Example 2 to a galvanized steel plate using an adhesive. The properties of the test specimen were evaluated by the methods described below, and the results are shown in Table 1 to Table 3.

⑥ Whitening resistance: evaluated by dropping a 1 kg iron ball on the test specimen from a height of 1 m using FDI (ball drop tester) manufactured by Labthink.

∘: Whitening phenomenon did not occur x: Whitening phenomenon occurred, or the sheet was torn or cracked ⑦ Surface gloss: measured in accordance with ASTM D523, at 60° using VG 7000 (gloss meter) manufactured by NIPPON DENSHOKU INDUSTRIES Co., LTD.

⑧ Appearance quality: The appearance of the test specimen was visually evaluated.

∘: There was no overall difference in gloss, and no surface curvature was present x: Gloss differed by position, and a local surface curvature was present

TABLE 2

| Classification | | Comparative Examples | | | | |
|---|---|---|---|---|---|---|
| | | 1 | 2 | 3 | 4 | 5 |
| (A) Graft | (A-1) | — | — | 30 | 60 | 60 |
| copolymer | (A-2) | 60 | 40 | 30 | — | — |
| (parts by weight) | | | | | | |
| (B) Matrix | (B-1) | — | — | — | — | — |
| copolymer | (B-2) | — | 60.0 | — | — | — |
| (parts by weight) | (B-5) | 40.0 | — | 40.0 | — | 15.0 |
| (C) Additive (parts by weight) | | — | — | — | 40 | 25 |
| Impact strength | | 40.30 | 13.60 | 30.80 | 4.40 | 5.20 |
| Hardness | | 90 | 104 | 84 | 85 | 77 |
| Elongation | | 40 | 25 | 89 | 25 | 26 |
| Weather resistance | | 12.50 | 1.27 | 5.18 | 0.93 | 3.26 |
| Trimming ability | | ∘ | x | ∘ | x | x |
| Whitening resistance | | x | x | ∘ | x | x |
| Surface gloss | | 42 | 67 | 45 | 50 | 44 |
| Appearance quality | | x | x | x | x | x |

(A-1) Graft copolymer having a small particle diameter: The graft copolymer of Preparation Example 1, in which styrene and acrylonitrile are grafted onto a butyl acrylate rubber polymer having an average particle diameter of 68.5 nm
(A-2) Graft copolymer having a large particle diameter: The graft copolymer of Preparation Example 2, in which styrene and acrylonitrile are grafted onto a butyl acrylate rubber polymer having an average particle diameter of 280.0 nm
(B-1) Matrix copolymer #1: The copolymer of Preparation Example 3 (weight-average molecular weight: 80,000 g/mol), which is a copolymer of 30 parts by weight of methyl methacrylate, 52.5 parts by weight of styrene and 17.5 parts by weight of acrylonitrile
(B-2) Matrix copolymer #2: The copolymer of Preparation Example 4 (weight-average molecular weight: 80,000 g/mol), which is a copolymer of 70 parts by weight of methyl methacrylate, 22.5 parts by weight of styrene and 7.5 parts by weight of acrylonitrile
(B-5) Matrix copolymer #5: The copolymer of Preparation Example 7 (weight-average molecular weight: 120,000 g/mol), which is a copolymer of 75 parts by weight of styrene and 25 parts by weight of acrylonitrile
(C) Additive: IH830 (copolymer of methyl methacrylate and methyl acrylate) manufactured by LG MMA

TABLE 1

| Classification | | Examples | | | | | | | |
|---|---|---|---|---|---|---|---|---|---|
| | | 1 | 2 | 3 | 4 | 5 | 6 | 7 | 8 |
| (A) Graft | (A-1) | 60 | 40 | 80 | 70 | 60 | 40 | 60 | 60 |
| copolymer (parts by weight) | (A-2) | — | — | — | — | — | — | — | — |
| (B) Matrix | (B-1) | 15.0 | — | — | — | — | — | — | — |
| copolymer | (B-2) | — | 20.0 | 5.0 | 10.0 | — | — | — | — |
| (parts by weight) | (B-3) | — | — | — | — | 20.0 | — | 15.0 | — |
| | (B-4) | — | — | — | — | — | 30 | — | 15.0 |
| (C) Additive (parts by weight) | | 25 | 40 | 15 | 20 | 20 | 30 | 25 | 25 |
| Impact strength | | 10.80 | 7.50 | 18.30 | 13.90 | 7.50 | 3.50 | 4.20 | 4.50 |
| Hardness | | 86 | 101 | 65 | 76 | 85 | 98 | 78 | 85 |
| Elongation | | 88 | 58 | 156 | 132 | 25 | 17 | 29 | 25 |
| Weather resistance | | 0.60 | 0.58 | 0.74 | 0.61 | 2.27 | 0.61 | 2.96 | 1.21 |
| Trimming ability | | ∘ | ∘ | ∘ | ∘ | ∘ | x | x | x |
| Whitening resistance | | ∘ | ∘ | ∘ | ∘ | x | x | x | x |
| Surface gloss | | 113 | 119 | 91 | 99 | 55 | 105 | 48 | 55 |
| Appearance quality | | ∘ | ∘ | ∘ | ∘ | x | x | x | x |

(A-1) Graft copolymer having a small particle diameter: The graft copolymer of Preparation Example 1, in which styrene and acrylonitrile are grafted onto a butyl acrylate rubber polymer having an average particle diameter of 68.5 nm
(A-2) Graft copolymer having a large particle diameter: The graft copolymer of Preparation Example 2, in which styrene and acrylonitrile are grafted onto a butyl acrylate rubber polymer having an average particle diameter of 280.0 nm
(B-1) Matrix copolymer #1: The copolymer of Preparation Example 3 (weight-average molecular weight: 80,000 g/mol), which is a copolymer of 30 parts by weight of methyl methacrylate, 52.5 parts by weight of styrene and 17.5 parts by weight of acrylonitrile
(B-2) Matrix copolymer #2: The copolymer of Preparation Example 4 (weight-average molecular weight: 80,000 g/mol), which is a copolymer of 70 parts by weight of methyl methacrylate, 22.5 parts by weight of styrene and 7.5 parts by weight of acrylonitrile
(B-3) Matrix copolymer #3: The copolymer of Preparation Example 5 (weight-average molecular weight: 80,000 g/mol), which is a copolymer of 15 parts by weight of methyl methacrylate, 63.75 parts by weight of styrene and 21.25 parts by weight of acrylonitrile
(B-4) Matrix copolymer #4: The copolymer of Preparation Example 6 (weight-average molecular weight: 80,000 g/mol), which is a copolymer of 85 parts by weight of methyl methacrylate, 11.26 parts by weight of styrene and 3.74 parts by weight of acrylonitrile
(C) Additive: IH830 (copolymer of methyl methacrylate and methyl acrylate) manufactured by LG MMA

TABLE 3

| Classification | | Comparative Examples | | | | |
|---|---|---|---|---|---|---|
| | | 6 | 7 | 8 | 9 | 10 |
| (A) Graft copolymer (parts by weight) | (A-1) | 40 | 80 | 67 | — | — |
| | (A-2) | — | — | — | 60 | 40 |
| (B) Matrix copolymer (parts by weight) | (B-1) | — | — | 33.0 | 15.0 | — |
| | (B-2) | — | 20.0 | — | — | 20.0 |
| | (B-5) | 20.0 | — | — | — | — |
| (C) Additive (parts by weight) | | 40 | — | — | 25 | 40 |
| Impact strength | | 3.10 | 21.50 | 7.20 | 49.60 | 35.00 |
| Hardness | | 84 | 54 | 65 | 87 | 103 |
| Elongation | | 19 | 142 | 101 | 121 | 81 |
| Weather resistance | | 2.73 | 1.82 | 2.51 | 1.84 | 1.25 |
| Trimming ability | | x | x | x | ○ | ○ |
| Whitening resistance | | x | ○ | x | x | x |
| Surface gloss | | 54 | 72 | 70 | 92 | 96 |
| Appearance quality | | x | ○ | ○ | ○ | ○ |

(A-1) Graft copolymer having a small particle diameter: The graft copolymer of Preparation Example 1, in which styrene and acrylonitrile are grafted onto a butyl acrylate rubber polymer having an average particle diameter of 68.5 nm
(A-2) Graft copolymer having a large particle diameter: The graft copolymer of Preparation Example 2, in which styrene and acrylonitrile are grafted onto a butyl acrylate rubber polymer having an average particle diameter of 280.0 nm
(B-1) Matrix copolymer #1: The copolymer of Preparation Example 3 (weight-average molecular weight: 80,000 g/mol), which is a copolymer of 30 parts by weight of methyl methacrylate, 52.5 parts by weight of styrene and 17.5 parts by weight of acrylonitrile
(B-2) Matrix copolymer #2: The copolymer of Preparation Example 4 (weight-average molecular weight: 80,000 g/mol), which is a copolymer of 70 parts by weight of methyl methacrylate, 22.5 parts by weight of styrene and 7.5 parts by weight of acrylonitrile
(B-5) Matrix copolymer #5: The copolymer of Preparation Example 7 (weight-average molecular weight: 120,000 g/mol), which is a copolymer of 75 parts by weight of styrene and 25 parts by weight of acrylonitrile
(C) Additive: IH830 (copolymer of methyl methacrylate and methyl acrylate) manufactured by LG MMA Referring to Table 1 to Table 3, in the case of the thermoplastic resin compositions of Examples 1 to 4, it was confirmed that the higher the content of the graft copolymer having a small particle diameter, the better the impact strength and elongation. In addition, in the case of the thermoplastic resin compositions of Examples 2 to 4, it was confirmed that the higher the content of the matrix copolymer and the additive, the better the hardness, weather resistance and surface gloss.

As a result of comparing Example 1, Example 7 and Example 8, it was confirmed that the thermoplastic resin composition of Example 1, which included a matrix copolymer prepared to include methyl methacrylate in an amount of 30 parts by weight, had better impact strength, hardness, elongation, weather resistance, trimming ability, whitening resistance, surface gloss and appearance quality than the thermoplastic resin composition of Example 7 which included a matrix copolymer prepared to include methyl methacrylate in an amount of 15 parts by weight. As a result of comparing Example 1 and Example 8, it was confirmed that the thermoplastic resin composition of Example 1, which included a matrix copolymer prepared to include methyl methacrylate in an amount of 30 parts by weight, had better impact strength, elongation, weather resistance, trimming ability, whitening resistance, surface gloss and appearance quality than the thermoplastic resin composition of Example 8 which included a matrix copolymer prepared to include methyl methacrylate in an amount of 85 parts by weight. From these results, it was confirmed that when a matrix copolymer including an appropriate amount of methyl methacrylate was used, the compatibility with the graft copolymer and the additive was significantly improved, such that impact strength, elongation, weather resistance, trimming ability, whitening resistance, surface gloss and appearance quality were improved.

As a result of comparing Example 1 and Comparative Example 4, it was confirmed that the thermoplastic resin composition of Example 1, which included a matrix copolymer, had better impact strength, elongation, weather resistance, trimming ability, whitening resistance, surface gloss and appearance quality than the thermoplastic resin composition of Comparative Example 4 which did not include a matrix copolymer.

As a result of comparing Example 1 and Comparative Example 5, it was confirmed that the thermoplastic resin composition of Example 1 had considerably better impact strength, hardness, elongation, weather resistance, trimming ability, whitening resistance, surface gloss and appearance quality than the thermoplastic resin composition of Comparative Example 5 which included a styrene/acrylonitrile polymer as a matrix copolymer. From this result, it was confirmed that when a matrix copolymer including methyl methacrylate was used, the compatibility with the graft copolymer and the additive was significantly improved, such that impact strength, elongation, weather resistance, trimming ability, whitening resistance, surface gloss and appearance quality were significantly improved.

As a result of comparing Example 1 and Comparative Example 8, it was confirmed that the thermoplastic resin composition of Example 1 had considerably better impact strength, hardness, weather resistance, trimming ability, whitening resistance, surface gloss and appearance quality than Comparative Example 8 which included the graft copolymer having a small particle diameter in an amount of 67 parts by weight and did not include the additive. From this result, it was confirmed that when a matrix copolymer including methyl methacrylate was used, the compatibility with the graft copolymer and the additive was significantly improved, such that impact strength, trimming ability, whitening resistance and surface gloss were improved even though the graft copolymer was included in a small amount.

As a result of comparing Example 1 and Comparative Example 9, it was confirmed that the thermoplastic resin composition of Example 1, which included the graft copolymer having a small particle diameter, had a lower impact strength but considerably better weather resistance, whitening resistance and surface gloss than the thermoplastic resin composition of Comparative Example 9 which included the graft copolymer having a large particle diameter.

As a result of comparing Example 2 and Example 6, it was confirmed that the thermoplastic resin composition of Example 2, which included a matrix copolymer prepared to include methyl methacrylate in an amount of 70 parts by weight, had better impact strength, elongation, trimming ability, whitening resistance, surface gloss and appearance quality than the thermoplastic resin composition of Example 6 which included a matrix copolymer including methyl methacrylate in an amount of 85 parts by weight.

As a result of comparing Example 2 and Comparative Example 6, it was confirmed that the thermoplastic resin composition of Example 2 had better impact strength, hardness, elongation, weather resistance, trimming ability, whitening resistance, surface gloss and appearance quality than the thermoplastic resin composition of Comparative Example 6 which included a styrene/acrylonitrile polymer as a matrix copolymer.

As a result of comparing Example 2 and Comparative Example 10, it was confirmed that the thermoplastic resin composition of Example 2, which included the graft copolymer having a small particle diameter, had a lower impact strength and lower elongation but considerably better weather resistance, whitening resistance and surface gloss than the thermoplastic resin composition of Comparative Example 10 which included the graft copolymer having a large particle diameter.

As a result of comparing Example 3 and Comparative Example 7, it was confirmed that the thermoplastic resin composition of Example 2 had better impact strength, elongation, weather resistance, trimming ability, whitening resistance, surface gloss and appearance quality than the thermoplastic resin composition of Comparative Example 7 which did not include a matrix copolymer.

As a result of comparing Example 5 and Example 7, it was confirmed that the thermoplastic resin composition of Example 5, which included a matrix copolymer in an amount of 20 parts by weight, had slightly better impact strength, weather resistance, trimming ability and surface gloss than the thermoplastic resin composition of Example 7 which included a matrix copolymer in an amount of 15 parts by weight.

In addition, as a result of comparing Example 5 and Comparative Example 4, it was confirmed that the thermoplastic resin composition of Example 5 had better impact strength and trimming ability than the thermoplastic resin composition of Comparative Example 4 which did not include a matrix copolymer.

As a result of comparing Comparative Example 1 and Comparative Example 2, it was confirmed that the thermoplastic resin composition of Comparative Example 1, which included an excessive amount of the graft copolymer having a large particle diameter, had better impact strength, elongation and trimming ability but lower weather resistance and lower surface gloss than the thermoplastic resin composition of Comparative Example 2.

In addition, as a result of comparing Comparative Example 1 and Comparative Example 3, it was confirmed that the thermoplastic resin composition of Comparative Example 3, which further included the graft copolymer having a small particle diameter, had better elongation, weather resistance, whitening resistance and surface gloss than the thermoplastic resin composition of Comparative Example 1, but neither Comparative Example 1 nor Comparative Example 3 had excellent overall properties.

The invention claimed is:

1. A thermoplastic resin composition comprising:
a graft copolymer, which is prepared by graft-polymerizing an aromatic vinyl-based monomer and a vinyl cyan-based monomer onto an acrylic rubber polymer having an average particle diameter of 50.0 nm to 90.0 nm;
a matrix copolymer, which includes a $C_1$-$C_3$ alkyl (meth)acrylate-based monomer unit, an aromatic vinyl-based monomer unit and a vinyl cyan-based monomer unit; and
an additive, which includes a polymer including a $C_1$-$C_3$ alkyl (meth)acrylate-based monomer unit,
wherein the additive is a homopolymer, or a copolymer that includes a C1-C3 alkyl methacrylate-based monomer unit and a C1-C3 alkyl acrylate-based monomer unit in a weight ratio of 80:20 to 99:1.

2. The thermoplastic resin composition of claim 1, wherein the matrix copolymer is a copolymer prepared using a monomer mixture including a $C_1$-$C_3$ alkyl (meth)acrylate-based monomer, an aromatic vinyl-based monomer and a vinyl cyan-based monomer.

3. The thermoplastic resin composition of claim 2, wherein the monomer mixture includes:
the $C_1$-$C_3$ alkyl (meth)acrylate-based monomer at 25 wt % to 75 wt %;
the aromatic vinyl-based monomer at 15 wt % to 60 wt %; and
the vinyl cyan-based monomer at 1 wt % to 20 wt %.

4. The thermoplastic resin composition of claim 2, wherein the matrix copolymer is a copolymer of methyl methacrylate, styrene and acrylonitrile.

5. The thermoplastic resin composition of claim 1, wherein the matrix copolymer has a weight-average molecular weight of 50,000 g/mol to 200,000 g/mol.

6. The thermoplastic resin composition of claim 1, wherein the polymer is a copolymer that includes two or more types of $C_1$-$C_3$ alkyl (meth)acrylate-based monomer units.

7. The thermoplastic resin composition of claim 1, wherein the thermoplastic resin composition includes, based on the total weight of the thermoplastic resin composition:
the graft copolymer at 30 wt % to 80 wt %;
the matrix copolymer at 0.1 wt % to 30.0 wt %; and
the additive at 5 wt % to 50 wt %.

8. The thermoplastic resin composition of claim 1, wherein the acrylic rubber polymer has an average particle diameter of 65.0 nm to 75.0 nm.

9. The thermoplastic resin composition of claim 1, wherein the additive is poly(methyl methacrylate) or a copolymer of methyl methacrylate and methyl acrylate.

10. The thermoplastic resin composition of claim 1, wherein the additive is the homopolymer.

11. The thermoplastic resin composition of claim 1, wherein the additive is the copolymer that includes a C1-C3 alkyl methacrylate-based monomer unit and a C1-C3 alkyl acrylate-based monomer unit in a weight ratio of 80:20 to 99:1.

12. The thermoplastic resin composition of claim 1, wherein the additive is the copolymer that includes a C1-C3 alkyl methacrylate-based monomer unit and a C1-C3 alkyl acrylate-based monomer unit in a weight ratio of 85:15 to 99:1.

* * * * *